United States Patent
Ono (10) Patent No.: US 11,512,874 B2
(45) Date of Patent: Nov. 29, 2022

(54) HEAT SOURCE DEVICE

(71) Applicant: RINNAI CORPORATION, Aichi (JP)

(72) Inventor: Takahiro Ono, Aichi (JP)

(73) Assignee: RINNAI CORPORATION, Aichi (JP)

(*) Notice: Subject to any disclaimer, the term of this patent is extended or adjusted under 35 U.S.C. 154(b) by 376 days.

(21) Appl. No.: 16/832,080

(22) Filed: Mar. 27, 2020

(65) Prior Publication Data

US 2020/0309412 A1    Oct. 1, 2020

(30) Foreign Application Priority Data

Apr. 1, 2019 (JP) .............................. JP2019-070096

(51) Int. Cl.
| | | |
|---|---|---|
| F24H 9/00 | (2022.01) |
| F23L 3/00 | (2006.01) |
| F23L 17/00 | (2006.01) |
| F23D 14/02 | (2006.01) |
| F24H 1/12 | (2022.01) |

(52) U.S. Cl.
CPC ............ F24H 9/0036 (2013.01); F23D 14/02 (2013.01); F23L 3/00 (2013.01); F23L 17/005 (2013.01); F24H 1/12 (2013.01); F23D 2208/005 (2013.01); F23D 2213/00 (2013.01)

(58) Field of Classification Search
CPC .......... F23L 17/005; F23L 3/00; F24H 9/0036
USPC ....................................................... 122/18.4
See application file for complete search history.

(56) References Cited

U.S. PATENT DOCUMENTS

| | | | | |
|---|---|---|---|---|
| 2008/0116687 A1* | 5/2008 | Filippi | ................... | F16L 19/00 |
| | | | | 285/231 |
| 2018/0187921 A1* | 7/2018 | Ojiro | ........................ | F23L 5/02 |

FOREIGN PATENT DOCUMENTS

JP        2017-20693        1/2017

* cited by examiner

*Primary Examiner* — Vivek K Shirsat
(74) *Attorney, Agent, or Firm* — Wenderoth, Lind & Ponack, LLP (57) ABSTRACT

A heat source device including a sheet-metal burner body (30), a fan casing (40) connected to the burner body (30), an annular packing (90) connecting a burner-side connection end surface (340) with a fan-side connection end surface (410) in an airtight state, a sheet-metal connection part (80) disposed between the burner-side connection end surface (340) and the fan-side connection end surface (410), wherein the connection part has an opening (85) and a packing storage portion (84) storing the annular packing (90), wherein the opening (85) is provided in such a manner that an opening edge is positioned outside of those of an inlet port (35) and a blowout port (44) in a state where the connection part (80) is disposed between the burner-side connection end surface (340) and the fan-side connection end surface (410).

3 Claims, 6 Drawing Sheets

PRIOR ART

FIG. 6　PRIOR ART

HEAT SOURCE DEVICE

FIELD OF THE INVENTION

The present invention relates to a heat source device. Especially, the present invention relates to the heat source device in which a burner body and a fan casing are connected to each other.

DESCRIPTION OF THE RELATED ART

Figure 5:
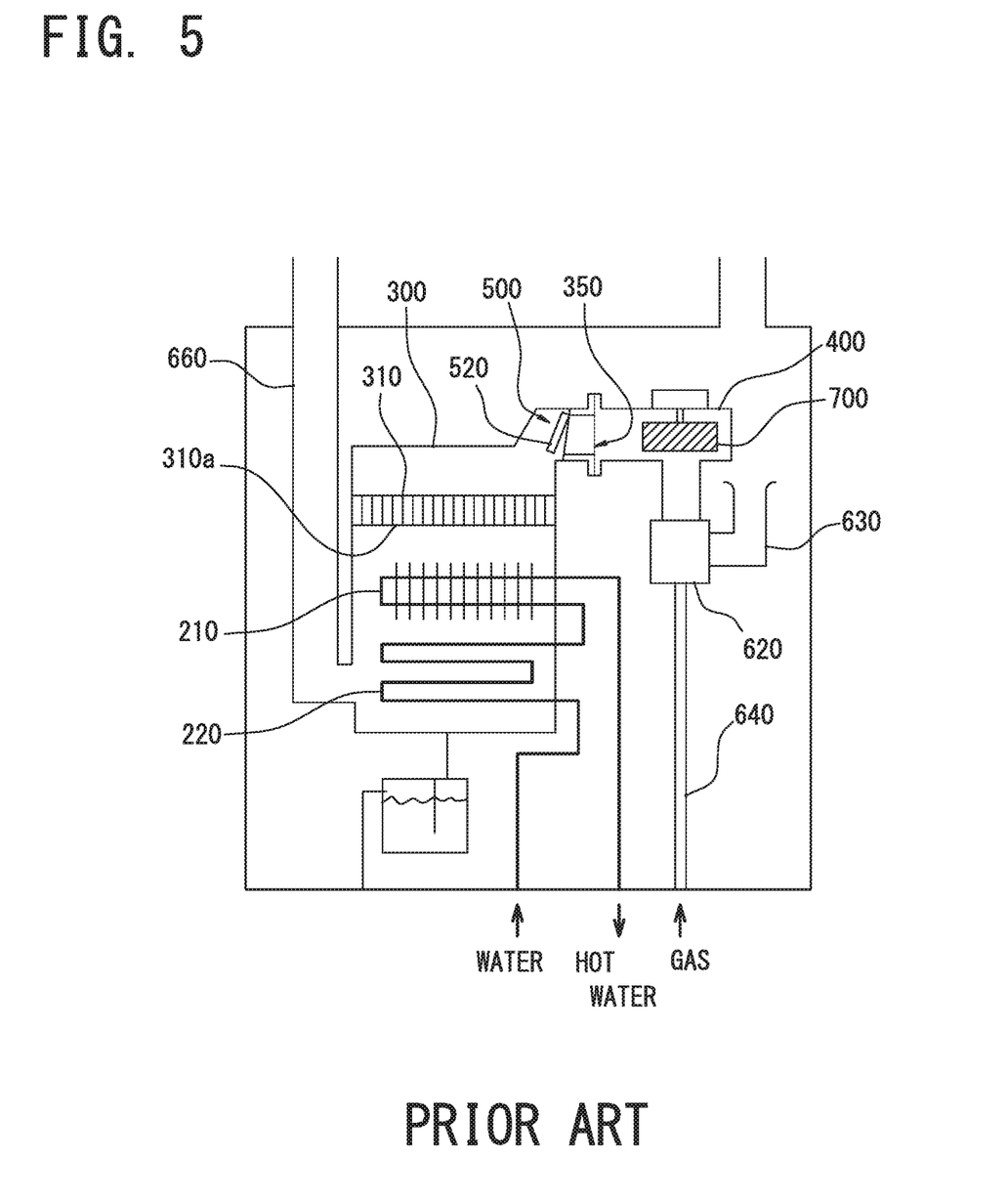
FIG. 5 is a schematic configuration view showing a conventional heat source device.

FIG. 5 is a schematic configuration view of a water heater that is one example of a conventional heat source device. As illustrated in FIG. 5, the water heater includes a downward combustion type-flat burner 310 mounted on a lower surface of a burner body 300 in such a manner that a combustion surface 310a is disposed facedown. In addition, a sensible heat recovery type-primary heat exchanger 210 is disposed below the combustion surface 310a of the burner 310, and a latent heat recovery type-secondary heat exchanger 220 is disposed below the sensible heat recovery type-primary heat exchanger 210.

In such a water heater, all air taken in through an air supply pipe 630 by rotating a fan 700 disposed in a fan casing 400 is fed to a mixing device 620. The air is then mixed with fuel gas fed through a gas supply pipe 640 in the mixing device 620 to generate a mixture gas. Further, the mixture gas is fed to the burner body 300 from the fan casing 400.

In the above-described water heater, since the combustion surface 310a of the burner 310 is disposed facedown, during a hot-water supply operation, combustion exhaust gas is ejected downward together with flames of the burner 310 by airflow of the fan 700. After the combustion exhaust gas is fed to the primary heat exchanger 210 and the secondary heat exchanger 220, the combustion exhaust gas is discharged outside the water heater from an exhaust port through an exhaust duct 660. During the hot-water supply operation, part of the combustion exhaust gas recovered the latent heat by the secondary heat exchanger 220 condenses into acid drain to remain in the secondary heat exchanger 220.

Further, in the above-described water heater, when combustion of the burner 310 is turned off by a stop of the hot-water supply operation, the airflow of the fan stops. In this condition, since the burner 310 is disposed above the heat exchangers 210 and 220, the acid drain remaining in the latent heat recovery type-secondary heat exchanger 220 evaporates to generate acid vapor ascending in the burner body 300. Thus, the acid vapor may flow beyond the burner 310 and into the fan casing 400 and the mixing device 620. As a result, if the acid vapor condenses in those members, blades of the fan 700 rust in the fan casing 400 and the mixing device 620 corrodes.

In light of the above-described problem, a check valve 500 is provided between the burner body 300 and the fan casing 400. The check valve 500 includes a flap 520 configured to only open to a downstream side of a gas flow passage of the mixture gas. This prevents the acid vapor from reaching the gas flow passage upstream of the burner body 300 during the stop of the fan 700 (for example, see Japanese Unexamined Patent Publication No. 2017-20693 A, hereinafter JP '693).

Figure 6:
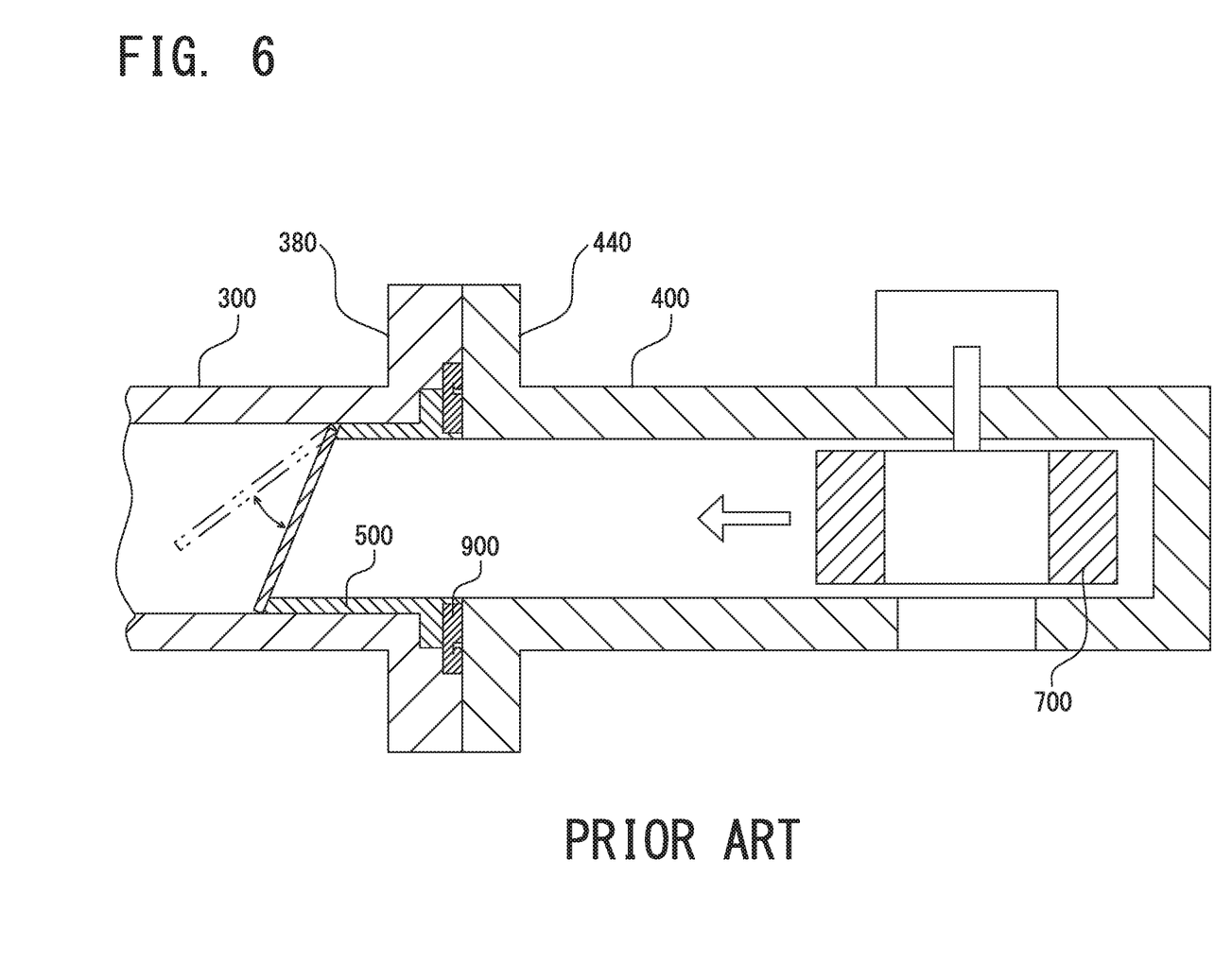
FIG. 6 is a partial enlarged cross-sectional view showing the conventional heat source device.

On the other hand, in order to supply the mixture gas from the fan casing 400 to the burner body 300 by the airflow of the fan 700, a fan-side connection flow passage in the fan casing 400 and a burner-side connection flow passage in the burner body 300 has to be connected to each other in an airtight state. According to the water heater of JP '693, a connection end surface at an upstream end of the burner-side connection flow passage of the burner body 300 has a stepped portion having a stair shape into which a peripheral portion of the check valve 500 and an annular packing 900 disposed upstream of the check valve 500 are fitted, as illustrated in FIG. 6.

However, in order to keep airtightness in a state where the check valve 500 and the annular packing 900 are sandwiched between the burner body 300 and the fan casing 400, it is necessary to precisely form a flange 380 at a connection end surface in a peripheral portion of an inlet port, which corresponds to the upstream end of the burner-side connection flow passage, and a flange 440 at a connection end surface in a peripheral portion of a blowout port, which corresponds to a downstream end of the fan-side connection flow passage, and to securely fasten the facing flanges 380 and 440 with a fastener such as a screw. Thus, it is necessary to manufacture both of the burner body 300 and the fan casing 400 by casting such as aluminum die casting, which causes an increase in manufacturing cost. Especially, according to JP '693, the stepped portion into which the check valve 500 and the annular packing 900 are fitted is formed in the connection end surface at the upstream end of the burner-side connection flow passage. Therefore, in order to keep airtightness, highly accurate processing is required, leading to a further increase in manufacturing cost.

SUMMARY OF THE INVENTION

The present invention has been made to solve the problem described above, and an object of the present invention is to provide a heat source device in which a mixture gas is supplied from a fan casing to a burner body at a low cost.

According to the present invention, there is provided a heat source device comprising:

a sheet-metal burner body having a burner mounted thereon; a fan casing connected to the burner body;

a fan disposed in the fan casing and configured to supply a mixture gas of fuel gas and combustion air to the burner;

an annular packing connecting, in an airtight state, a burner-side connection end surface in a peripheral portion of an inlet port formed at an upstream end of a burner-side connection flow passage of the burner body with a fan-side connection end surface in a peripheral portion of a blowout port formed at a downstream end of a fan-side connection flow passage of the fan casing; and a sheet-metal connection part disposed between the burner-side connection end surface and the fan-side connection end surface, wherein the connection part is fixed to the burner body and fastened to the fan casing, and the connection part has an opening and a packing storage portion storing the annular packing, wherein the packing storage portion is provided so as to be positioned between the opening and the burner-side connection end surface, and the opening is provided in such a manner that an opening edge of the opening is positioned outside of those of the inlet port and the blowout port in a state where the connection part is disposed between the burner-side connection end surface and the fan-side connection end surface.

Other objects, features and advantages of the present invention will become more fully understood from the detailed description given hereinbelow and the accompanying drawings which are given by way of illustration only, and thus are not to be considered as limiting the present invention.

DESCRIPTION OF THE EMBODIMENTS

Figure 1:
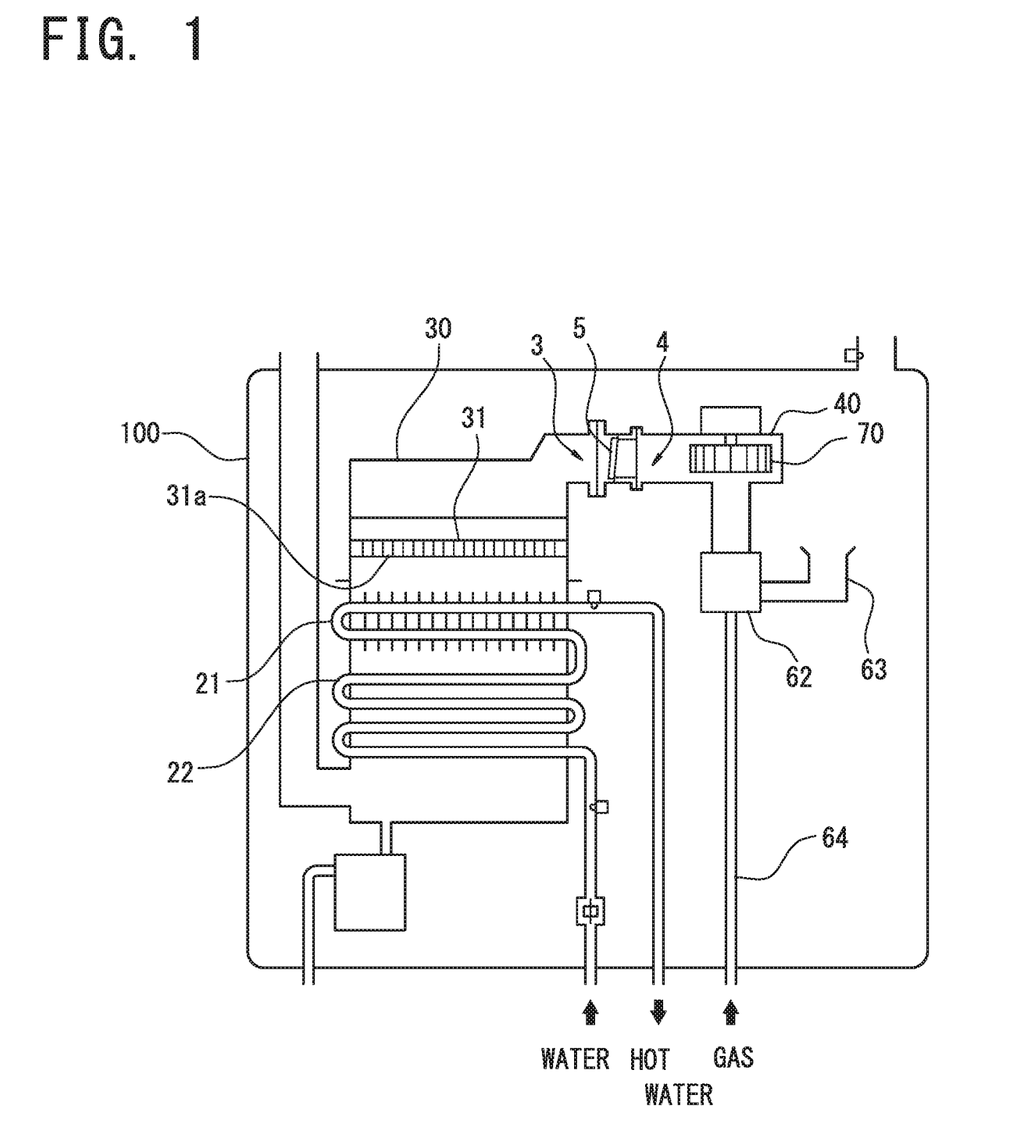
FIG. 1 is a schematic configuration view showing a heat source device according to an embodiment of the present invention.

Hereinafter, referring to drawings, a heat source device according to an embodiment of the present invention will be described in detail. FIG. 1 is a schematic configuration view showing the heat source device according to the embodiment of the present invention applied to a water heater, and FIG. 2 is a partial exploded perspective view showing a principal portion of the heat source device.

The casing 100 of the water heater accommodates a burner body 30 on which a burner 3-31 is mounted, and a fan casing 40 which communicates with the burner body 30. The burner 31 has a downward combustion surface 31a. The fan casing 40 lies on its side. Inside the fan casing 40, a vertical shaft fan 70 for supplying a mixture gas of air and fuel gas to the burner 31 in the burner body 31 is accommodated. In the present specification, a direction in which the burner body 30 and the fan casing 40 are arranged side by side is referred to as a left-and-right direction, a lateral direction horizontally orthogonal to the left-and-right direction is referred to as a front-and-rear direction, and a height direction vertically orthogonal to the left-and-right direction is referred to as an up-and-down direction. In addition, following a passage of the mixture gas formed by rotation of the fan 70, the side of the fan casing 40 is referred to as an upstream side, and the side of the burner body 30 is referred to as a downstream side.

First and second heat exchangers 21 and 22 that are heated by combustion exhaust gas from the burner 31, are consecutively disposed below the burner 31 in the burner body 30. A mixing device 62 for mixing the air with the fuel gas is consecutively disposed upstream of the fan casing 40. An air supply pipe 63 for supplying the air and a gas supply pipe 64 for supplying the fuel gas are coupled to the mixing device 62.

Figure 2:
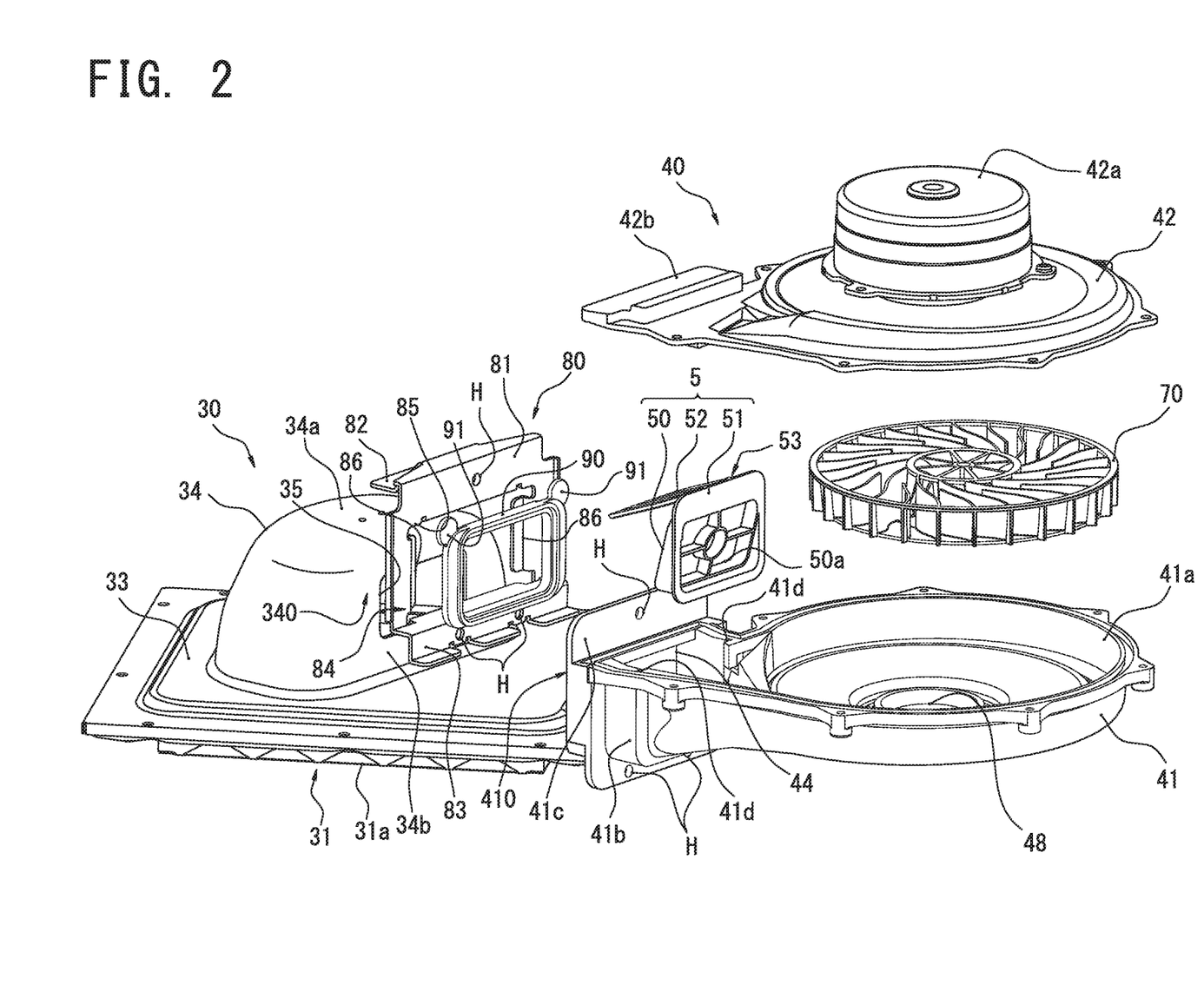
FIG. 2 is a partial exploded perspective view showing the heat source device according to the embodiment of the present invention.

As illustrated in FIG. 2, the fan casing 40 includes a lower casing 41 having a fan storage portion 41a which is opened upward and in which a fan 70 is stored, and an upper casing 42 having a motor storage portion 42a in which a motor is stored. The lower casing 41 and the upper casing 42 are both manufactured through casting, such as aluminum die casting, for example. The fan storage portion 41a of the lower casing 41 has a lower surface formed with a suction port 48. The mixture gas supplied from the mixing device 62 flows into the suction port 48 by the rotation of the fan 70. In addition, a lower passage portion 41b which is opened upward and has a substantially U-shape cross-section extends on a downstream side continuous to an outer circumferential surface of the fan storage portion 41a of the lower casing 41. The lower passage portion 41b has a mounting flange 41c extending outward from a peripheral edge of a downstream end thereof. The mounting flange 41c extending downward is formed at a predetermined position slightly upstream of the downstream end of the lower passage portion 41b. Further, the upper casing 42 has a passage lid portion 42b extending on a downstream side of the motor storage portion 42a so as to cover an upper opening of the lower passage portion 41b. The passage lid portion 42b is provided in such a manner that a downstream end of the passage lid portion 42b comes into contact with an upstream end surface of the mounting flange 41c extending upward. Thus, according to the present embodiment, when the lower casing 41 and the upper casing 42 are joined to each other, the lower passage portion 41b of the lower casing 41 and the passage lid portion 42b of the upper casing 42 form a fan-side connection flow passage 4 having a substantially rectangular shape and defining a downstream-side connection flow passage of the fan casing 40, through which the mixture gas flows from the fan casing 40 toward the burner body 30. In addition, the lower passage portion 41b of the lower casing 41 has the downstream end which opens laterally and thus, a downstream-end opening of the fan casing 40 forms a blowout port 44 through which the mixture gas is blown out. Furthermore, the mounting flange 41c provides a flat fan-side connection end surface 410. It is to be noted that structures of the lower casing 41 and the upper casing 42 are not particularly limited. The fan casing 40 may be provided by joining together the lower casing 41 and the upper casing 42 each having a height half of the fan casing 40, for example. Further, the upper casing 42 may constitute a portion of the mounting flange 41c.

Figure 3:
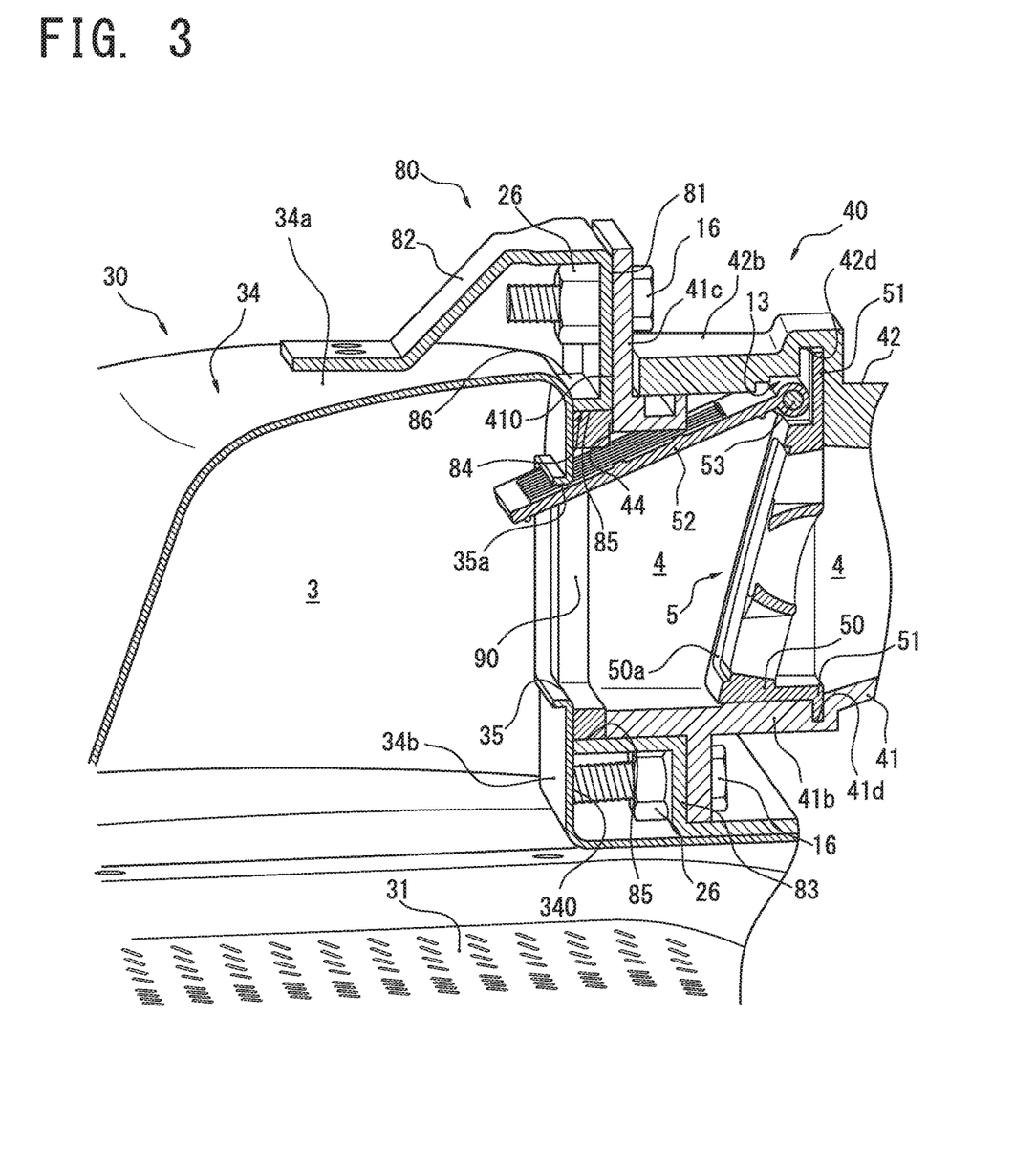
FIG. 3 is a partial enlarged cross-sectional view showing a state in which a check valve of the heat source device is opened according to the embodiment of the present invention.

As illustrated in FIGS. 2 and 3, the lower passage portion 41b of the lower casing 41 has a lower groove 41d at a predetermined location upstream of the downstream end of the lower passage portion 41b, which is recessed outward from an inner surface of the lower passage portion 41b. In addition, the passage lid portion 42b of the upper casing 42 has an upper groove 42d at a location facing the lower groove 41d when the lower casing 41 and the upper casing 42 are joined to each other. The upper groove 42d is recessed outward from an inner surface of the passage lid portion 42b. A flange piece 51 of a casing body 50 of a check valve 5 (described later) is fitted into the upper and lower grooves 42d, 41d. It is to be noted that the upper and lower grooves 42d, 41d may not be formed in the whole inner surface of structural walls defining the fan-side connection flow passage 4, and may be only formed at a position corresponding to the flange piece 51.

The passage lid portion 42b of the upper casing 42 has a stepped portion downstream of the upper groove 42d, which protrudes upward with a predetermined height. Accordingly, when the lower casing 41 and the upper casing 42 are joined to each other, an upper inner surface of the fan-side connection flow passage 4 downstream of the upper groove 42d expands upwardly as compared with that of the fan-side connection flow passage 4 upstream of the upper groove 42d. Thus, a depressed portion 13 depressed upward is formed downstream of and adjacent to the upper groove 42d. In the depressed portion 13, a pivotally supporting portion 53 of the check valve 5 (described later) is stored. In addition, an upper edge of the blowout port 44 formed at the downstream end of the lower passage portion 41b of the lower casing 41 is provided so as to be lower in height than the inner surface of the passage lid portion 42b, which has the depressed portion 13. That is, the upper edge of the blowout port 44 is disposed a position more internally within the fan-side connection flow passage 4.

The mounting flange 41c, which extends in the up-and-down direction, respectively have a screw insertion holes H bored therethrough. Via the screw insertion holes H, the fan casing 40 and a mounting frame 80 (described later) are connected to each other.

The check valve 5 is stored at a predetermined location upstream of the blowout port 44 of the fan casing 40. The check valve 5 includes: the casing body 50 having an opening 50a and having a substantially rectangular cylindrical tube shape; the flange piece 51 extending outward from an upstream end edge of an outer peripheral surface of the casing body 50; a flap 52 that is disposed downstream of the opening 50a of the casing body 50 and configured to open only to the downstream side by flow of the mixture gas; and the pivotally supporting portion 53 for rotatably pivotally supporting the flap 52.

The casing body 50 has a downstream end surface inclined with its lower end located more downstream than its upper end. Thus, when the opening 50a of the casing body 50 is closed by the flap 52, the flap 52 is inclined along the opening 50a, and the lower end of the flap 52 is located more downstream than the upper end of the flap 52, which is pivotally supported by the pivotally supporting portion 53.

As described above, the flange piece 51 is fitted into the lower groove 41d formed on the inner surface of the lower passage portion 41b of the lower casing 41, and the upper groove 42d formed on the inner surface of the passage lid portion 42b of the upper casing 42. Thus, movement of the check valve 5 in the up-and-down direction and in the left-and-right direction is restricted, whereby the check valve 5 is fixed in the fan-side connection flow passage 4. In the present embodiment, the flange piece 51 extends along the entire outer peripheral surface of the casing body 50. However, in a case where the casing body 50 having the substantially rectangular cylindrical tube shape is used, flange pieces 51 may alternatively be provided on outer peripheral surfaces of at least either of a pair of side walls facing in the up-and-down direction and a pair of side walls facing in the front-and-rear direction, among outer peripheral surfaces of two pairs of facing side walls of the casing body 50.

The pivotally supporting portion 53 for pivotally supporting the flap 52 is arranged above an upper side wall of the casing body 50 and downstream of an upper portion of the flange piece 51. Further, as described above, the pivotally supporting portion 53 is stored in the depressed portion 13 formed in the fan-side connection flow passage 4. Consequently, as illustrated in FIG. 3, the upper edge of the blowout port 44 is lower in height than a lower end of the pivotally supporting portion 53. That is, the upper edge of the blowout port 44 is disposed a position more internally within the fan-side connection flow passage 4. With this configuration, the mixture gas having flowed from the upstream side through the fan-side connection flow passage 4 smoothly flows toward the blowout port 44, without being interfered by the pivotally supporting portion 53.

Figure 4:
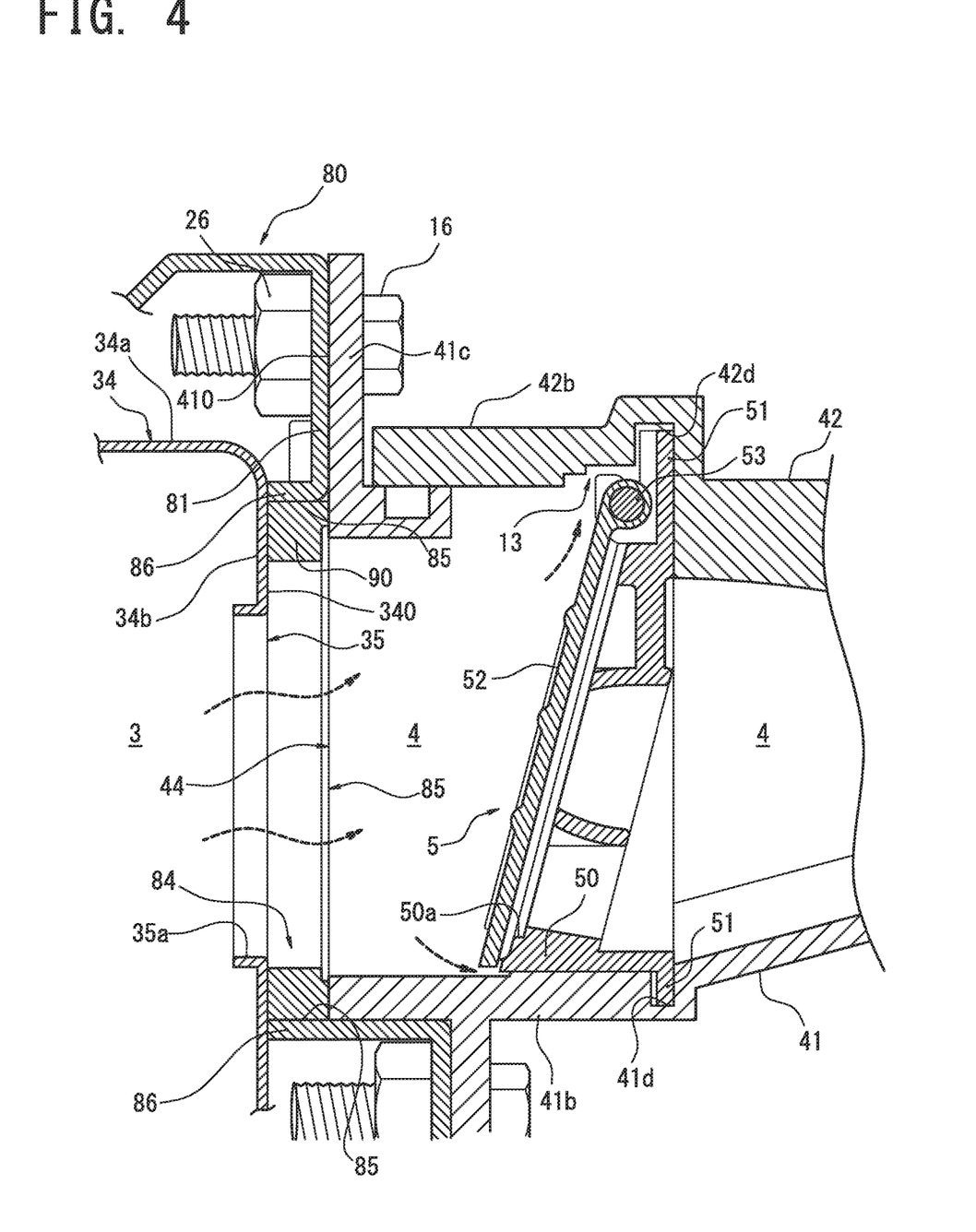
FIG. 4 is a partial enlarged cross-sectional view showing a state in which the check valve of the heat source device is closed according to the embodiment of the present invention.

Further, as illustrated in FIG. 4, the check valve 5 is disposed in the fan-side connection flow passage 4 in such a manner that the flap 52 is positioned upstream of the blowout port 44 when the mixture gas does not flow through the fan-side connection flow passage 4 and the flap 52 is closed. Thus, the flap 52 does not protrude from the blowout port 44 toward the downstream side during connection work for connecting the burner body 30 and the fan casing 40 to each other. With this configuration, misalignment due to interference by the flap 52 can be avoided.

Further, as illustrated in FIG. 3, the check valve 5 is disposed in the fan-side connection flow passage 4 in such a manner that the flap 52 comes into contact with an upper edge of an inlet port 35 of the burner body 30 (described later) when the mixture gas flows through the fan-side connection flow passage 4 and the flap 52 is opened. With this configuration, rotation of the flap 52 is restricted by the upper edge of the inlet port 35 even in a case where a large amount of mixture gas flows through the fan-side connection flow passage 4. Thus, the flap 52 can be prevented from being deformed and caught by another element, even in a case where the flap 52 is made of a deformable material such as rubber.

As illustrated in FIGS. 2 and 3, the burner body 30 has: a main burner body unit 33 that has the burner 31 mounted on a lower surface, and a substantially flat rectangular shape; and a tubular introducing unit 34 that protrudes upward from a portion of an upper surface of the main burner body unit 33. The main burner body unit 33 and the introducing unit 34 are manufactured in an integrated manner through press-molding of a single metallic plate into a predetermined shape. The burner 31 is of an all primary air combustion type. The burner 31 includes a ceramic combustion plate having many flame ports opening downwardly or a combustion mat made by knitting metal fabric woven like a net. The burner 31 has a downward combustion surface 31a, and burns the mixture gas supplied from the fan casing 40.

The introducing unit 34 has an introduction port (not shown) communicating with the main burner body unit 33, which opens downwardly, and the inlet port 35 having a rectangular shape, which opens laterally. Therefore, when the burner body 30 and the fan casing 40 are connected to each other, the burner body 30 and the fan casing 40 communicate with each other via the inlet port 35 and the blowout port 44 corresponding to the downstream-end opening of the fan casing 40 as described above. Further, an internal space of the introducing unit 34 forms a burner-side connection flow passage 3 defining an upstream-side connection passage of the burner body 30, and an upstream-end opening of the burner body 30 forms the inlet port 35.

Of walls constituting the introducing unit 34, a side wall 34b provided with the inlet port 35 and an upper wall 34a are substantially planar. Further, the side wall 34b having the inlet port 35 is inclined in such a manner that a frontward side end is located in a substantially central portion of a frontward portion of the upper surface of the main burner body unit 33 in the left-and-right direction, and that a rearward end is located in a right side portion of a rearward portion of the upper surface of the main burner body unit 33. The side wall 34b has an upstream end surface in which the inlet port 35 opens laterally, and the upstream end surface forms a burner-side connection end surface 340. The burner-side connection end surface 340 and the fan-side connection end surface 410, which is formed by the mounting flange 41c extending outward from the downstream end of the lower passage portion 41b of the lower casing 41, are connected to each other via the mounting frame 80 and an annular packing 90 (described later).

The inlet port 35 is formed by burring the side wall 34b of the introducing unit 34. Thus, the inlet port 35 has a burring portion 35a protruding toward the downstream side from the opening edge of the inlet port 35, which corresponds to the upstream end of the burner body 30. With this configuration, the flap 52 can be reliably prevented from being deformed and caught by the upper edge of the inlet port 35, even when the flap 52 of the check valve 5 turns toward the downstream side and comes into contact with the upper edge of the inlet port 35.

Further, the upper edge of the inlet port 35 is lower in height than that of the blowout port 44. As described above, the blowout port 44 is provided in such a manner that the upper edge of the blowout port 44 is lower in height than the inner surface of the passage lid portion 42b forming the fan-side connection flow passage 4 from the blowout port 44 to the depressed portion 13. Thus, the height of the side wall 34b, in which the inlet port 35 facing the blowout port 44 is provided, can be made lower, whereby the height of the introducing unit 34 can be made lower. With this configuration, the burner body 30 can be made smaller. Further, since the height of the introducing unit 34 can be made lower, the burner body 30 with the introducing unit 34 can be manufactured by drawing a sheet metal.

The inlet port 35 is formed in such a manner that the opening is slightly larger than a width of the flap 52. Further, as described above, the upper edge of the blowout port 44 is lower in height than the lower end of the pivotally supporting portion 53, and the upper edge of the inlet port 35 is lower in height than that of the blowout port 44. Furthermore, the rotation of the flap 52 is restricted by the upper edge of the inlet port 35. Therefore, even when the amount of the mixture gas increases so that the flap 52 is opened at a maximum opening degree, the lower end of the flap 52 is located lower than the lower end of the pivotally supporting portion 53. It is therefore possible to prevent from excessively rotating and deforming the flap 52.

The mounting frame (connection part) 80 is manufactured through press-molding of a single metallic plate into a shape having a substantially crank-shaped longitudinal section. The mounting frame 80 includes: a main frame 81 having a substantially rectangular shape and including a packing storage portion 84 for storing the compressibly deformable annular packing 90; a joint piece 82 extending from an upper end of the main frame 81 toward the downstream side and having a substantially stair shape; and a lower piece 83 extending from a lower end of the main frame 81 toward the upstream side and having a substantially stair shape. In the main frame 81, a frame opening (opening) 85 is provided. The frame opening 85 has a substantially rectangular shape and a size substantially identical to that of an outer peripheral edge of the annular packing 90. Further, when the mounting frame 80 is fixed to the burner body 30, protruding pieces 86 are respectively formed at four sides of an opening edge of the frame opening 85 so as to protrude toward the burner-side connection end surface 340 on the downstream side. Of the four protruding pieces 86, two protruding pieces 86 on the front and rear sides have their protruded ends bent inward. Consequently, as illustrated in FIGS. 3 and 4, when the mounting frame 80 is fixed to the burner body 30, a recess portion having a predetermined depth in a direction along the gas flow passage is formed between the frame opening 85 and the side wall 34b forming the burner-side connection end surface 340 by these protruding pieces 86. The recess portion serves as the packing storage portion 84.

The frame opening 85 is provided in the main frame 81 in such a manner that the opening edge of the frame opening 85 is disposed outside of those of the inlet port 35 and the blowout port 44 in a state where the mounting frame 80 is placed between the side wall 34b forming the burner-side connection end surface 340, and the mounting flange 41c forming the fan-side connection end surface 410. Further, the main frame 81 of the mounting frame 80 has an upper end extending above the upper wall 34a of the introducing unit 34. Screw insertion holes H through which the screws 16 insert are bored in the main flame 81 above the packing storage portion 84 and the lower piece 83 below the packing storage portion 84. Thus, the main flame 81 and the lower piece 83 serve as a joint flange for fastening the mounting frame 80 to the fan casing 40.

The mounting frame 80 is fixed to the burner body 30 in the following manner. That is, before the burner body 30 and the fan casing 40 are connected to each other, the joint piece 82, the lower piece 83, and bent portions of the two front and rear protruding pieces 86 are respectively spot-welded to an upper exterior surface of the upper wall 34a of the introducing unit 34, to an upper exterior surface of the main burner body unit 33, and to the side wall 34b of the introducing unit 34 forming the burner-side connection end surface 340. This can prevent displacement between the inlet port 35 and the annular packing 90 stored in the packing storage portion 84.

The annular packing 90 has a substantially rectangular annular body. The annular packing 90 has an inner peripheral edge (i.e., packing opening) having a size substantially identical to that of the blowout port 44 of the fan casing 40. Further, as described above, the frame opening 85 has a size substantially identical to that of the outer peripheral edge of the annular packing 90. Thus, when the annular packing 90 is stored in the packing storage portion 84, the outer peripheral edge of the annular packing 90 comes into substantial contact with inner surfaces of the protruding pieces 86 forming the packing storage portion 84. Although not illustrated, front and rear facing side portions of the annular packing 90 are formed in such a manner that a thickness of an outer region within a certain distance from the outer peripheral edge is smaller than that of the inner peripheral edge. That is, the annular packing 90 has stepped portions between the inner peripheral edge and the outer peripheral edge. To the stepped portions, the front and rear protruding pieces 86, which are bent inwardly, are engaged. The packing storage portion 84 is provided in such a manner that when the annular packing 90 is fitted into the packing storage portion 84, an upstream end surface of the annular packing 90 slightly protrudes toward the upstream side from an upstream-side opening edge of the packing storage portion 84, and a downstream end surface of the annular packing 90 slightly protrudes toward the downstream side from a downstream-side opening edge of the packing storage portion 84. Further, the outer peripheral edge of the annular packing 90 has protruding pieces 91 protruding outwardly at upper front and rear corners. When the annular packing 90 is fitted into the packing storage portion 84, the protruding pieces 91 are engaged to a peripheral portion the frame opening 85.

In order to the burner body 30 and the fan casing 40 are connected to each other, the annular packing 90 is first fitted into the packing storage portion 84 of the mounting frame 80 having been joined by welding to the burner body 30, and the protruding pieces 91 are engaged to the peripheral portion of the frame opening 85. Subsequently, the burner body 30 and the fan casing 40 are placed to face each other in such a manner that the main frame 81 of the mounting frame 80 is interposed between the side wall 34b, which provides the burner-side connection end surface 340, and the mounting flange 41c, which provides the fan-side connection end surface 410. Then, the screws 16 are inserted into the screw insertion holes H in the mounting flange 41c and the mounting frame 80, and the screws 16 are tightened with nuts 26. When the screws 16 are screwed into the nuts 26, upstream end surfaces of the main frame 81 and the lower piece 83 comes into contact with a downstream end surface of the mounting flange 41c. Consequently, the blowout port 44, which corresponds to the downstream-end opening of the fan casing 40, and the inlet port 35, which corresponds to the upstream-end opening of the burner body 30, facing each other communicate with each other via the mounting frame 80 and the annular packing 90. Further, as a result of the tightening, the annular packing 90 is compressed in the direction along the gas flow passage. Consequently, the upstream end surface of the annular packing 90 comes into close contact with the fan-side connection end surface 410 in a peripheral portion of the blowout port 44, and the downstream end surface of the annular packing 90 comes into close contact with the burner-side connection end surface 340 in a peripheral portion of the inlet port 35. Furthermore, the outer peripheral edge of the annular packing 90 extends outwardly by the compression, and comes into contact with the inner surfaces of the protruding pieces 86, which form the packing storage portion 84. Consequently, the burner body 30 and the fan casing 40 are connected to each other in an airtight state.

As understood from comparison between FIGS. 3 and 6, unlike a burner body manufactured through casting, the burner body 30 made of a sheet metal does not allow a flange for fastening the burner body 30 to the fan casing 40 to be formed in the peripheral portion of the inlet port 35. Further, as understood from FIGS. 3 and 4, if a fastening portion is directly formed in the introducing unit 34 of the burner body 30 made of a sheet metal, this may potentially cause leakage of the mixture gas from the burner body 30.

However, according to the present embodiment, the mounting frame 80 pre-joined by welding to the burner body 30 is interposed between the burner-side connection end surface 340 in the peripheral portion of the inlet port 35 of the burner body 30 and the fan-side connection end surface 410 in the peripheral portion of the blowout port 44 of the fan casing 40, and the annular packing 90 is stored in the packing storage portion 84 formed between the frame opening 85 of the mounting frame 80 and the burner-side connection end surface 340. Further, the frame opening 85 is provided in such a manner that the opening edge is outside of the opening edges of the inlet port 35 and the blowout port 44 in a state where the mounting frame 80 is placed between the burner-side connection end surface 340 and the fan-side connection end surface 410. Thus, by fastening the mounting frame 80 joined to the burner body 30 to the fan casing 40 with a fastener such as a screw, it is possible to cause the annular packing 90 stored in the packing storage portion 84 to come into contact with the burner-side connection end surface 340 and the fan-side connection end surface 410 in the airtight state. As a result, the burner body 30 and the fan casing 40 can be connected to each other via the mounting frame 80 as the connection part and the annular packing 90 in the airtight state. Further, since the mounting frame 80 as the connection part and the burner body 30 are joined together by welding at a location outside the gas flow passage, the joining work does not need to be performed by highly accurate welding. Therefore, according to the present embodiment, it is possible to employ the burner body 30 made of a sheet metal, thereby significantly reducing the manufacturing cost.

On the other hand, in a case where the mounting frame 80 is disposed between the burner body 30 and the fan casing 40, it is necessary to keep airtightness at two boundaries, i.e., a downstream boundary between the burner body 30 and the mounting frame 80 and an upstream boundary between the mounting frame 80 and the fan casing 40. However, according to the present embodiment, the downstream end surface of the annular packing 90 stored in the packing storage portion 84 of the mounting frame 80 is in close contact with the burner-side connection end surface 340, and the upstream end surface of the annular packing 90 is in close contact with the fan-side connection end surface 410. Consequently, it is possible to keep airtightness with the single annular packing 90. Further, according to the present embodiment, the mounting frame 80 is fixed to the burner body 30, and the annular packing 90 is stored in the packing storage portion 84. Consequently, disengagement or misalignment of the annular packing 90 during an assembling process can be prevented.

Further, according to the present embodiment, the annular packing 90 has the protruding pieces 91 engaged to the peripheral portion of the frame opening 85 of the mounting frame 80. Thus, the annular packing 90 hardly falls off from the packing storage portion 84 during a process of temporarily fixing the annular packing 90 to the packing storage portion 84. This can provide a streamlined assembling process.

Further, according to the present embodiment, the mounting frame 80 is fastened to the fan casing 40 with the screw. Consequently, the fan casing 40 is readily removed from the burner body 30 in maintenance and the like.

Other Embodiments (1) In the above embodiment, the water heater is used. Alternatively, a heat source device such as a boiler may be used.

(2) In the above embodiment, the joint piece, the lower piece, and the protruding pieces of the mounting frame as the connection part are respectively fixed to the upper exterior surface of the introducing unit, to the upper exterior surface of the main burner body unit, and to the burner-side connection end surface. Alternatively, the connection part may not be fixed to the burner-side connection end surface.

(3) In the above embodiment, the mounting frame as the connection part is connected to the burner body by welding. Alternatively, the mounting frame as the connection part is connected to the burner body by crimping or bonding.

(4) In the above embodiment, the screw as the fastener is used. Alternatively, another fastener such as a rivet may be used.

As described in detail, the present invention is summarized as follows.

According to the present invention, there is provided a heat source device comprising:

a sheet-metal burner body having a burner mounted thereon;

a fan casing connected to the burner body;

a fan disposed in the fan casing and configured to supply a mixture gas of fuel gas and combustion air to the burner;

an annular packing connecting, in an airtight state, a burner-side connection end surface in a peripheral portion of an inlet port formed at an upstream end of a burner-side connection flow passage of the burner body with a fan-side connection end surface in a peripheral portion of a blowout port formed at a downstream end of a fan-side connection flow passage of the fan casing; and a sheet-metal connection part disposed between the burner-side connection end surface and the fan-side connection end surface, wherein the connection part is fixed to the burner body and fastened to the fan casing, and the connection part has an opening and a packing storage portion storing the annular packing, wherein the packing storage portion is provided so as to be positioned between the opening and the burner-side connection end surface in a state where the connection part is fixed to the burner body, and the opening is provided in such a manner that an opening edge of the opening is positioned outside of those of the inlet port and the blowout port in a state where the connection part is disposed between the burner-side connection end surface and the fan-side connection end surface.

According to the heat source device described above, the burner body is manufactured through press-molding of a sheet metal, which is more economical than casting. On the other hand, when the burner body is manufactured from the sheet metal, the burner body made of the sheet metal does not allow a flange for fastening the burner body to the fan casing to be formed in the peripheral portion of the inlet port. Further, if a fastening portion is directly formed in the burner body made of the sheet metal, this may potentially cause leakage of the mixture gas from the burner body.

However, according to the heat source device described above, the sheet metal connection part fixed to the burner body and fastened to the fan casing is interposed between the burner-side connection end surface and the fan-side connection end surface, and the annular packing is stored in the packing storage portion formed between the opening of the connection part and the burner-side connection end surface. Further, the opening of the connection part is provided in such a manner that the opening edge of the opening is outside of those of the inlet port and the blowout port in a state where the connection part is placed between the burner-side connection end surface and the fan-side connection end surface. Thus, by fastening the connection part fixed to the burner body to the fan casing with the fastener, it is possible to cause the annular packing stored in the packing storage portion to come into contact with the burner-side connection end surface and the fan-side connection end surface in the airtight state. As a result, the burner body and the fan casing can be connected to each other via the connection part and the annular packing in the airtight state.

On the other hand, in a case where the connection part is disposed between the burner body and the fan casing, it is necessary to keep airtightness at two boundaries, e.g., a downstream boundary between the burner body and the connection part and an upstream boundary between the connection part and the fan casing. However, according to the heat source device described above, the downstream end surface of the annular packing stored in the packing storage portion of the connection part is in close contact with the burner-side connection end surface, and the upstream end surface of the annular packing is in close contact with the fan-side connection end surface. Consequently, it is possible to keep airtightness between the burner body and the fan casing with the single annular packing.

Further, according to the heat source device described above, the connection part is fixed to the burner body, and the annular packing is stored in the packing storage portion of the connection part. Consequently, disengagement or misalignment of the annular packing during an assembling process can be prevented.

Preferably, in the heat source device described above, the packing storage portion has a recess portion formed between the opening and the burner-side connection end surface, and the annular packing is disposed in the recess portion.

According to the heat source device described above, the annular packing is stored in the recess portion formed between the opening of the connection part and the burner-side connection end surface and recessed toward a downstream side of a gas flow passage from the opening. Consequently, the disengagement or misalignment of the annular packing during the assembling process can be reliably prevented.

Preferably, in the heat source device above, the annular packing has a projecting portion projecting outward from an outer peripheral portion thereof, and the projecting portion engages to a peripheral portion of the opening.

According to the heat source device described above, the annular packing has the protruding pieces engaged to the peripheral portion of the opening. Thus, before the burner body and the fan casing are connected to each other, the annular packing hardly falls off from the packing storage portion during a process of temporarily fixing the annular packing to the packing storage portion. This can provide a streamlined assembling process.

Preferably, in the heat source device above, the burner body includes:

a main burner body unit on which the burner is mounted; and an introducing unit protruding upward and outward from a portion of the main burner body unit, having a side face including the inlet port, and defining the burner-side connection flow passage, wherein the connection part is fixed by welding to an upper exterior surface of the main burner body unit, to an upper exterior surface of the introducing unit, and to the burner-side connection end surface in the peripheral portion of the inlet port, and the connection part is fastened to the fan-side connection end surface with a screw.

According to the heat source device described above, the connection part is fixed by welding to the upper exterior surface of the main burner body unit, to the upper exterior surface of the introducing unit, and to the burner-side connection end surface in the peripheral portion of the inlet port. Thus, before the burner body and the fan casing are connected to each other, the connection part can be fixed to the burner body in such a manner that the opening is positioned at a predetermined location facing the inlet port. Further, since the connection part is fastened to the fan-side connection end surface with the screw, the fan casing is readily removed from the burner body in maintenance and the like.

As described above in detail, according to the present invention, since the sheet-metal burner body is used, the heat source device in which the mixture gas is supplied from the fan casing to the burner body can be provided at a low cost.

The present application claims a priority based on a Japanese Patent Application No. 2019-70096 filed on Apr. 1, 2019, the content of which is hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

The invention claimed is:

1. A heat source device comprising:
   a sheet-metal burner body having a burner mounted thereon, the sheet-metal burner body being formed of a press-molded sheet metal;
   a fan casing connected to the burner body;
   a fan disposed in the fan casing and configured to supply a mixture gas of fuel gas and combustion air to the burner;
   an annular packing connecting, in an airtight state, a burner-side connection end surface in a peripheral portion of an inlet port formed at an upstream end of a burner-side connection flow passage of the burner body with a fan-side connection end surface in a peripheral portion of a blowout port formed at a downstream end of a fan-side connection flow passage of the fan casing; and
   a sheet-metal connection part disposed between the burner-side connection end surface and the fan-side connection end surface,
   wherein the connection part is fixed to the burner body and fastened to the fan casing,
   wherein the connection part has an opening and a packing storage portion storing the annular packing,
   wherein the packing storage portion is positioned between the opening and the burner-side connection end surface,
   wherein the packing storage portion is a recess portion surrounded by the burner-side connection end surface, the fan-side connection end surface, and an opening edge of the opening of the connection part in a state where the connection part is disposed between the burner-side connection end surface and the fan-side connection end surface,
   wherein the opening is configured such that the opening edge of the opening is positioned outside of an opening edge of the inlet port and an opening edge of the blowout port in a state where the connection part is disposed between the burner-side connection end surface and the fan-side connection end surface,
   wherein the connection part is welded to the burner-side connection end surface, and the connection part is fastened to the fan-side connection end surface with a screw.

2. The heat source device according to claim 1, wherein the annular packing has a projecting portion projecting outward from an outer peripheral portion thereof, and the projecting portion engages to a peripheral portion of the opening.

3. The heat source device according to claim 1, wherein the burner body includes:
   a main burner body unit on which the burner is mounted; and
   an introducing unit protruding upward and outward from a portion of the main burner body unit, having a side face including the inlet port, and defining the burner-side connection flow passage, wherein
   the connection part is fixed by welding to an upper exterior surface of the main burner body unit, to an upper exterior surface of the introducing unit, and to the burner-side connection end surface in the peripheral portion of the inlet port.

* * * * *